United States Patent
Böhm et al.

(10) Patent No.: US 9,348,130 B2
(45) Date of Patent: May 24, 2016

(54) DEVICE FOR HOLDING FILTERS FOR MICROSCOPES

(71) Applicant: Leica Microsystems CMS GmbH, Wetzlar (DE)

(72) Inventors: Ingo Böhm, Heidelberg (DE); Dirk-Oliver Fehrer, Bad Schönborn (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 0 days.

(21) Appl. No.: 14/303,730

(22) Filed: Jun. 13, 2014

(65) Prior Publication Data

US 2014/0293409 A1      Oct. 2, 2014

Related U.S. Application Data

(63) Continuation of application No. 13/428,066, filed on Mar. 23, 2012, now Pat. No. 8,786,944.

(30) Foreign Application Priority Data

Mar. 25, 2011   (DE) .................... 20 2011 000 688 U

(51) Int. Cl.
   *G02B 21/24*   (2006.01)
   *G02B 5/20*    (2006.01)
   *G02B 7/16*    (2006.01)

(52) U.S. Cl.
   CPC ............ *G02B 21/248* (2013.01); *G02B 5/20* (2013.01); *G02B 7/16* (2013.01); *G02B 21/24* (2013.01)

(58) Field of Classification Search
   CPC .......... G02B 21/248; G02B 5/20; G02B 7/16; G02B 21/24
   USPC ............................ 359/368, 491.01, 885–892
   See application file for complete search history.

(56) References Cited

U.S. PATENT DOCUMENTS

| 8,859,263 B2 * | 10/2014 | Greenberger et al. ..... 435/286.1 |
| 2006/0008843 A1 | 1/2006 | Sachesenmeier et al. |
| 2008/0112070 A1 | 5/2008 | Tanibata et al. |
| 2012/0050852 A1 | 3/2012 | Angelini et al. |
| 2014/0243223 A1 * | 8/2014 | Duffy et al. ...................... 506/9 |

FOREIGN PATENT DOCUMENTS

DE                19702754 B4        7/1998

* cited by examiner

*Primary Examiner* — Frank Font
(74) *Attorney, Agent, or Firm* — Hodgson Russ LLP

(57) ABSTRACT

A device for holding filters for a microscope includes a filter wheel (20) rotatable about an axis of rotation (16) and a drive unit (14) for rotating the filter wheel (20). The filter wheel (20) comprises a basic body (44) rotatable about the axis of rotation (16) and at least one segment (46-54) selectively connectable to the basic body. The segment (46-54) comprises at least two housing areas (58, 59) each holding at least one filter (11). Another housing area may provide a transmission range (36, 59) for unfiltered transmission of light. A second rotatable filter wheel may be arranged at a location displaced along the axis of rotation relative to the filter wheel, and may have its own respective transmission range for unfiltered transmission of light, whereby a filter on either filter wheel may be aligned with the transmission range on the other filter wheel.

9 Claims, 9 Drawing Sheets

DEVICE FOR HOLDING FILTERS FOR MICROSCOPES

CROSS REFERENCE TO RELATED APPLICATIONS

This application claims priority of German patent application number 20 2011 000 688.3 filed Mar. 25, 2011, the entire disclosure of which is incorporated by reference herein.

FIELD OF THE INVENTION

The present invention relates to a device for holding filters for microscopes, including a filter wheel pivot-mounted around an axis of rotation, the wheel containing a multitude of housing areas for holding filters.

BACKGROUND OF THE INVENTION

In microscopy, different filters are arranged in the ray path of the microscope in order to obtain a good detection result. Examples include microscopes with a filter wheel that comprises several housing areas, in each of which a filter is glued in. The filter wheel is pivot-mounted wherein the filter required for the respective application is turned into the ray path.

The problem with such microscopes is that if a filter is required which is not included in the filter wheel the entire filter wheel has to be changed which is time-consuming. Furthermore, a multitude of filter wheels has to be provided which entails high costs. Another aspect is that these filter wheels have only a relatively small number of housing areas so that the filter wheel has to be changed relatively often.

Document DE 197 02 754 B4 shows a filter turret comprising a filter wheel with six housings for filters in each of which a filter can be glued in. Moreover, the filter wheel possesses an element which can be extended laterally of the filter wheel into which an additional filter can be screwed in. The problem with this filter turret is that only a relatively small number of filters can be accommodated, so that the filters have to be changed frequently. As only one of the filters can be changed the filter wheel can only be adapted to the respective application to an extremely limited extent. For example, if for an application two filters will be needed alternately, both of which are not accommodated permanently in the filter wheel, it will be necessary to switch constantly between these two filters by means of the interchangeable position.

What is needed is a device for housing filters for microscopes which enables and provides an application range as broad as possible.

SUMMARY OF THE INVENTION

According to a first aspect of the invention the device comprises two filter wheels which are rotatable independently of each other about the same axis of rotation, with the two filter wheels being staggered in the axial direction of the axis of rotation relative to each other. Moreover, the device comprises a drive unit for rotating the first filter wheel and for rotating the second filter wheel about the axis of rotation. Both filter wheels each show a multitude of housing areas for holding at least one filter and a transmission range for the unfiltered transmission of light.

For using a filter which is accommodated in a housing area of the first filter wheel for microscopy the first filter wheel is rotated such that the housing area in which this filter is located is arranged in the ray path of the microscope. In this case the second filter wheel is rotated such that the transmission range of the second filter wheel is arranged in the ray path, so that only the required filter which is located in the first filter wheel filters the light and the second filter wheel does not impair the light.

Inversely, in order to utilize a filter which is located in the second filter wheel the filter wheel is rotated such that the transmission range in which this filter is arranged is rotated in the ray path of the microscope. Respectively, the first filter wheel is rotated such that its transmission range is arranged in the ray path.

Thus, by providing two rotary filter wheels which can be rotated independently of each other it is achieved that by means of a given diameter of the filter wheels and by means of a given filter size a higher number of filters can be accommodated in the device. Together with a very compact design this leads to an increased range of application. Especially, the number of filter wheels which have to be changed will be reduced.

The transmission range of the first filter wheel is particularly formed by a housing area of the first filter wheel which is not equipped with a filter, and the transmission range of the second filter wheel is particularly formed by a housing area of the second filter wheel which is not equipped with a filter. The housing areas are each preferably provided with a through bore with a first diameter and with a second bore which does not penetrate the respective filter wheel completely with a second diameter, the second diameter being larger than the first diameter. The filters which are to be inserted in the housing areas have in particular a diameter which is slightly smaller than the second diameter, so that these can be accommodated in the second bore and can be glued in. By means of the through bore the light used for microscopy can pass through provided the respective housing area is rotated in the ray path of the microscope.

In a first operating state in which a first filter for microscopy arranged in the first filter wheel is to be used, the filter wheels are rotated such that a first housing area of the first filter wheel which accommodates the first filter and the transmission range of the second filter wheel align. In a second operating state in which a second filter is used for microscopy which is accommodated in a second housing area of the second filter wheel, the filter wheels are turned such that the second housing area and the transmission range of the first filter wheel align. As a result the desired filter can be used easily for microscopy without the other filter wheel interfering.

Preferably, the first and the second filter wheels are each mounted to a column in which the longitudinal axis and the axis of rotation coincide by means of a releasable and restorable connection. Thus, it is easy to change the filter wheels if none of the filters accommodated in the filter wheels is suitable for the application and another filter wheel has to be used. The releasable and restorable connection is particularly designed as a bolted connection so that the filter wheels can be changed easily.

The drive unit has in particular at least one stepping motor for turning the first filter wheel and/or for turning the second filter wheel. Alternatively, two stepping motors can be provided, in which case each stepping motor is designed for rotating one of the filter wheels. By means of the motor-driven rotation of the filter wheels a more exact rotation of the filter wheels is achieved in comparison to a manual turning of the filter wheels resulting in an easier operation of the device.

Additionally or alternatively, the drive unit may comprise a manual operating element for rotating the first filter wheel and/or for rotating the second filter wheel. In particular, the driving unit may have two manually operable operating elements with one operating element used for rotating the first filter wheel and the other operating element use for rotating the second filter wheel.

In a particularly preferred embodiment of the invention the first filter wheel and/or the second filter wheel each have a basic body which can be rotated about the axis of rotation and at least one connecting segment which can be connected with the basic body by means of a releasable and restorable connection. The segment accommodates at least two of the housing areas of the respective filter wheel. Thus, if one filter has to be changed it is not necessary to change the entire filter wheel but only the segment. Two housing sections have the advantage that in one single operation several filters can be changed, so that changing each filter does not require a separate operation. By means of the segment it is particularly possible to change two filters which, as experience has shown, are used frequently together, in one single operation.

It is advantageous if the segment comprises at least three housing areas with each holding at least one filter so that by changing one segment a higher number of filters can be changed.

The releasable and restorable connection between the basic body and the segment is particularly formed as a bolted connection wherein the basic body comprises preferably two bores each of which has an inside thread and the segment includes two through bores so that the segment can be bolted securely to the basic body by means of two screws. The bolted connection has the advantage that it can be released and restored nearly as often as desired.

The segment is particularly formed as a ring-shaped segment. The external diameter of the segment preferably corresponds to the external diameter of the filter wheel.

Moreover, it is advantageous if the segment shows an assembly bore with an internal thread. In order to attach the segment to the basic body a bolt or a screw is screwed in this assembly bore so that the segment can be easily held manually while it is attached to the basic body by means of the releasable and restorable connection. After the releasable and restorable connection has been formed, the bolt or screw which has been screwed in the assembly bore is removed. This leads to an especially comfortable and secure handling of the segment during assembly.

In a preferred embodiment the first and/or the second filter wheel each comprise at least two segments which can be connected by means of a releasable and restorable connection to the basic body, wherein the segments each comprise at least two, preferably at least three of the housing areas of the respective filter wheel. By providing two such segments it is achieved that the arrangement of the filters of the filter wheel can be adapted even more easily and better to the respective application so that the number of necessary changes of filter wheels and/or segments can be reduced further.

It is especially advantageous if all housing areas of the first filter wheel and/or all housing areas of the second filter wheel are arranged in the segments of the respective filter wheel so that all housing areas, and thus the incorporated filters as well, can be changed easily by means of changing the respective segments.

To achieve this, the first or the second filter wheel respectively, comprises a multitude of segments in the form of ring segments, which are connected to the basic body by means of a releasable and restorable connection, with the segments together forming a closed circle. In particular, five segments are intended, each of which comprise an angle of 72° of the circle they are forming. In each segment two or three housing areas are arranged leading to a high number of filters that can be accommodated in the filter wheel.

Moreover the device shows preferably at least one sensor by means of which the angle of rotation of the first filter wheel and/or the second filter wheel can be detected. This leads to an easy way of detecting the angle of rotation of the individual filter wheels, and when selecting the filter wheels this angle can be taken into consideration in order to ensure that the filter wheels are rotated in direction to the necessary position of the respective application. The sensor unit in particular comprises at least one light barrier with radially protruding tags at the filter wheels which interrupt the light beam of the light barrier.

Moreover, the device may comprise at least another, third filter wheel which can also rotate about the axis of rotation, independently from the two other filter wheels. The third filter wheel comprises a variety of housing areas for holding at least one filter and one transmission range for an unfiltered transmission of light. The third filter wheel can be developed further with the features described above with regard to the first filter wheel and/or the second filter wheel.

Another aspect relates to a microscope which comprises a device for holding filters by means of the method described above. This device is mainly arranged inside the housing of the microscope with the housing comprising at least one lid which can be opened for changing the filter wheels and/or the segments. During a first operating state the filter wheels are rotated such that a first filter held in a first housing area of the first filter wheel, and the transmission range of the second filter wheel are arranged in the ray path of the microscope. Whereas during a second operating state the filter wheels are rotated such that a second filter accommodated in a second housing area of the second filter wheel and the transmission range of the first filter wheel are arranged in the ray path of the microscope. Thus, it is possible to use all filters held in the filter wheels easily for microscopy.

Another aspect of the invention relates to a device for holding filters with microscopes which include a filter wheel that is pivoted around an axis of rotation and a drive unit for rotating the filter wheel about the axis of rotation. The filter wheel on the other hand comprises a basic body pivoted around the axis of rotation, and a least one segment that can be connected to the basic body by means of a releasable and restorable connection. The segment comprises at least two housing areas for holding at least one filter.

By means of the segment which can be connected to the basic body through a releasable and restorable connection, it is achieved that not the entire filter wheel has to be changed in order to change one filter, but only one segment. By providing two housing areas in the segment it is achieved that several filters can be changed together, thus reducing the necessary working steps for changing the filters.

The filter wheel can be developed further analogously to the segmented first or respectively the second filter wheel of the device with regard to the first aspect of the invention. In the same way the previously mentioned advantages can be achieved with the second embodiment as well by means of the described features of the filter wheel in connection with the first aspect. In comparison with the first embodiment the second embodiment has the advantage that the design is finer as only one filter wheel is intended.

The filter wheel mainly includes a multitude of segments in form of ring segments which are connected to the basic body or framework by means of releasable and restorable connection, preferably a bolted connection which each have two or three housing areas which each accommodate one filter. In particular, the segments together form a closed circle so that all housing areas of the filter are arranged in the segments and all housing areas can be changed together with the filters accommodated therein.

In an alternative embodiment of the invention the basic body itself can as well accommodate at least one housing area for housing at least one filter. In this case only one part of the housing area of the filter wheel can be changed, namely the part which is accommodated in the segments of the filter wheel.

Another aspect relates to a microscope which includes a device for housing filters according to the last-described embodiment. In a first operating state the filter wheel is rotated such that a first filter incorporated in a first housing area of the filter wheel is arranged in the ray path of the microscope and in a second operating state such that a second filter accommodated in a second housing area of the filter wheel is arranged in the ray path. Thus, the required filter can be positioned easily in the ray path by rotating the filter wheel.

Another aspect relates to a segment for housing filters which comprises two housing sections for housing at least one filter and one connecting area through which the segment can be connected to a basic body of a filter wheel by means of a releasable and restorable connection. The segment can be developed further in connection with the segments of the device previously described.

BRIEF DESCRIPTION OF THE DRAWINGS

Further features and advantages of the invention result from the following description which, together with the added figures, illustrates the invention in more detail by means of embodiments. In the drawing figures.

DETAILED DESCRIPTION OF THE INVENTION

Figure 1:
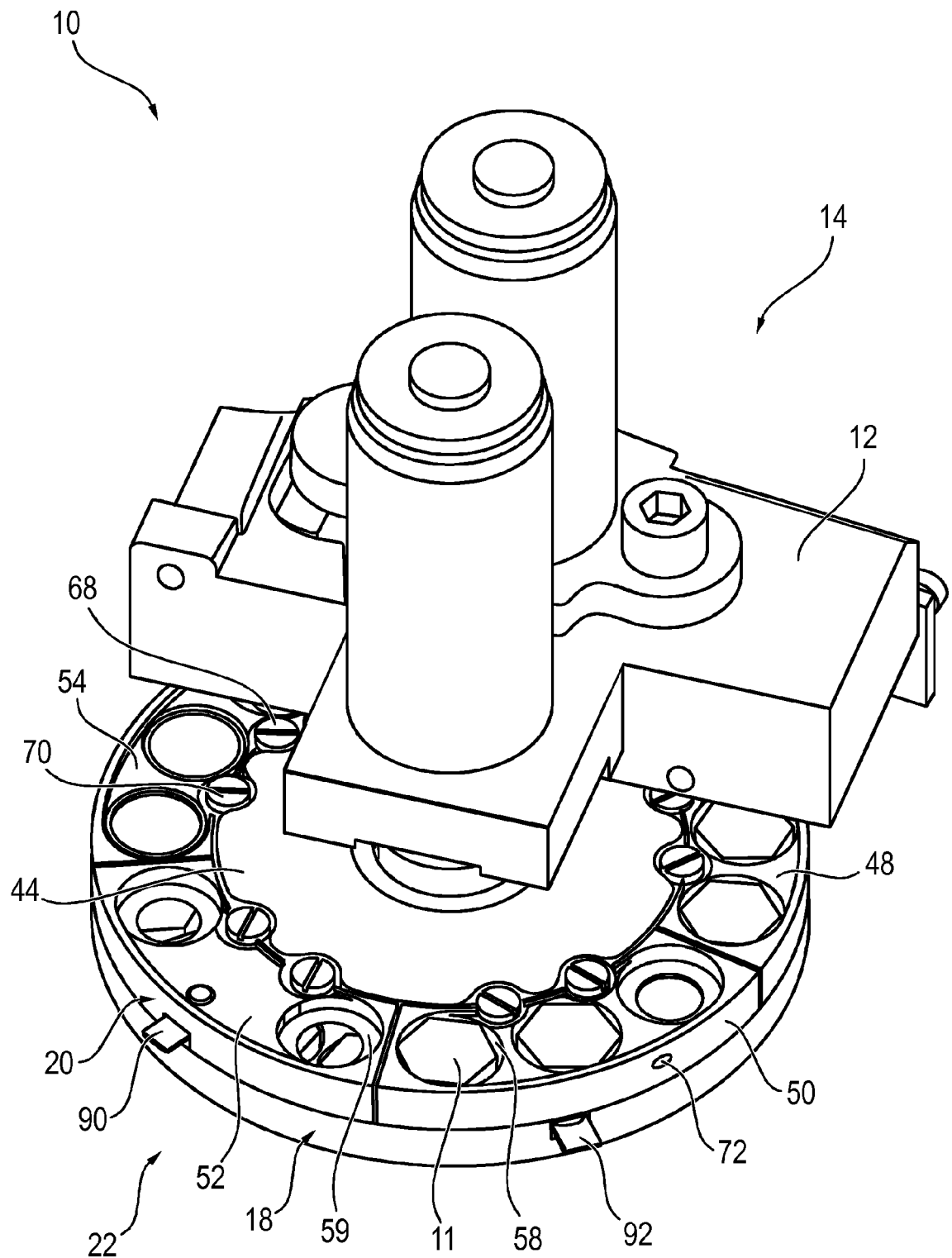
FIG. 1 shows a schematic, perspective illustration of a device for housing filters.

FIG. 1 shows a schematic, perspective illustration of a device 10 for housing filters 11. Device 10 is especially used in microscopes in order to position the required filter 11 in the ray path of the microscope according to the respective application.

Figure 2:
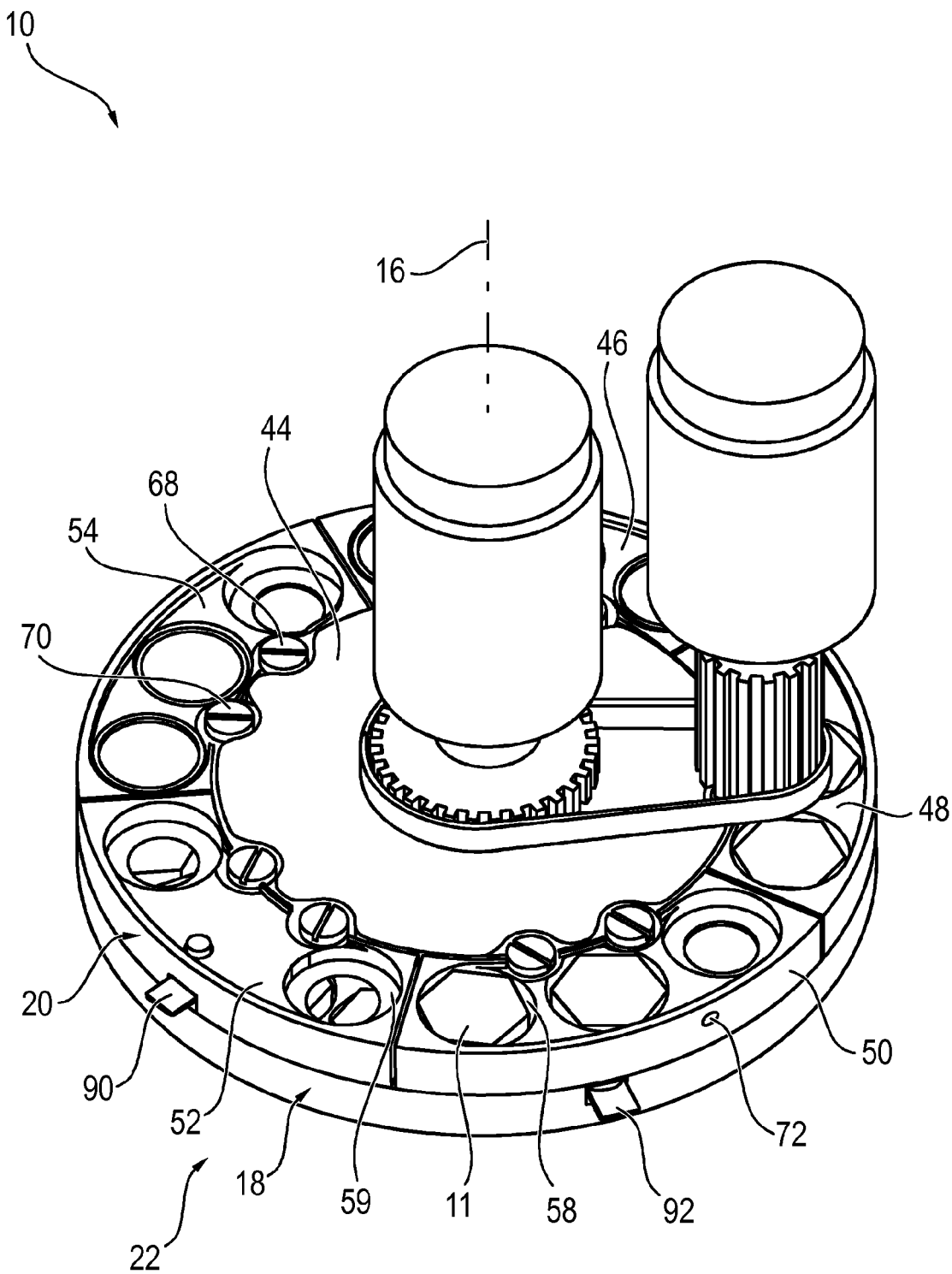
FIG. 2 shows a further schematic, perspective illustration of the device according to FIG. 1.

FIG. 2 shows a further schematic, perspective illustration of device 10, whereas in FIG. 2 for better clarity a housing 12 of a driving unit 14 is not shown.

Device 10 comprises a rotary first filter wheel 18 which can be rotated about an axis of rotation 16 by means of drive unit 12, and a rotary second filter wheel 20 which can also be rotated about this axis of rotation 16 by means of drive unit 14. In this case, the filter wheels 18, 20 are rotary independently of each other about the axis of rotation 16; i.e. if one of the filter wheels 18, 20 is rotated, the other filter wheel 18, 20 is not rotating automatically.

Figure 3:
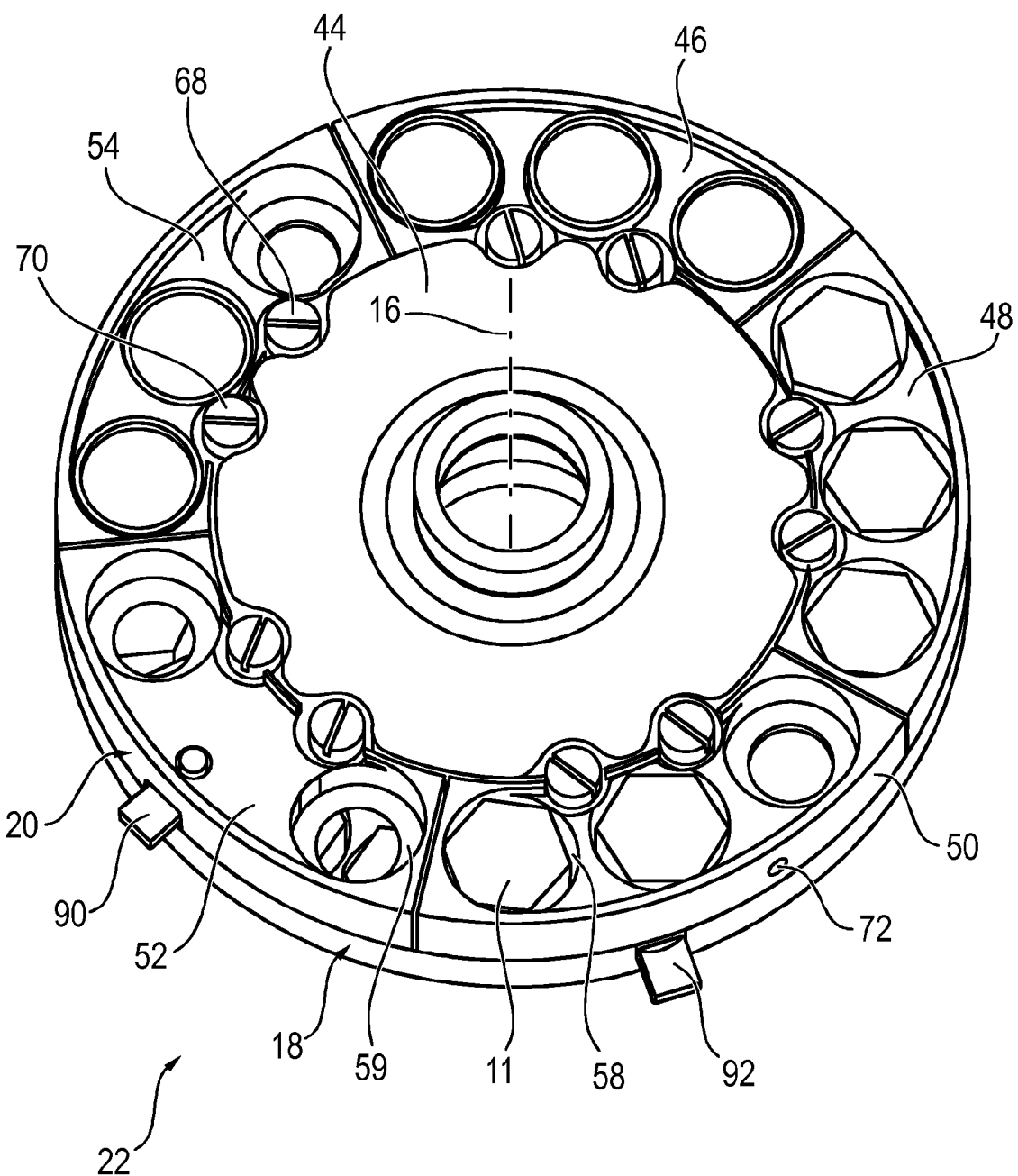
FIG. 3 shows a schematic, perspective illustration of a filter wheel pair of the device according to FIGS. 1 and 2.

Both filter wheels 18, 20 together form a so-called filter wheel pair which is illustrated separately in FIG. 3.

Figure 4:
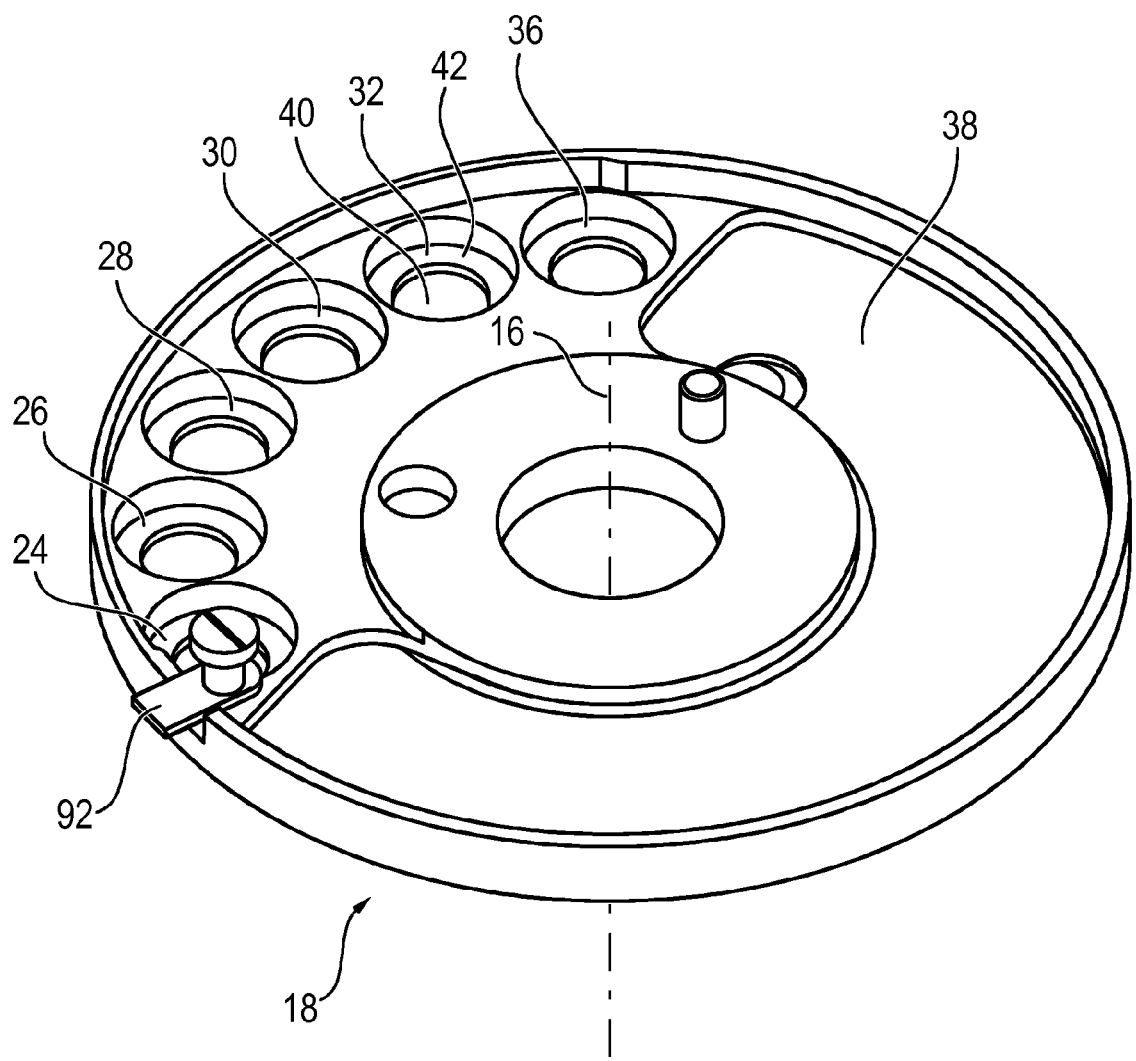
FIG. 4 shows a schematic, perspective illustration of a first filter wheel of the filter wheel pair according to FIG. 3.

FIG. 4 shows a schematic, perspective illustration of the first filter wheel 18. The first filter wheel 18 is provided with seven housing areas 24, 26, 28, 30, 32, 36 and 38, in each of which one filter 11 can be accommodated. Housing area 38 is larger than the other housing areas 24 to 36, and is intended for accommodating a polarizing filter. The six housing areas 24 to 36 are formed identically and are each fitted with two bores with the smaller borehole being a through bore through which an opening 40 for the transmission of light is formed. Furthermore, the two bores form a support area 42 on which the filters 11 rest, which are not illustrated in FIG. 4, when they are accommodated in the respective housing area 24 to 36. In particular, the filters 11 are glued in the respective housing areas 24 to 36.

When equipping the first filter wheel 18, filters 11 are inserted in five of the six housing areas 24 to 36 at the most, so that at least one of the housing areas 24 to 36 remains free. This not-equipped free housing area 24 to 36 serves as a transmission range through which light can pass unfiltered. An alternative embodiment has a transmission range housing area which differs from the housing areas 24 to 36 which actually accommodate filters 11. In particular, the transmission range has a diameter which is smaller than the diameter of filters 11. This ensures that not all housing areas 24 to 36 are inadvertently equipped with filters 11.

Figure 5:
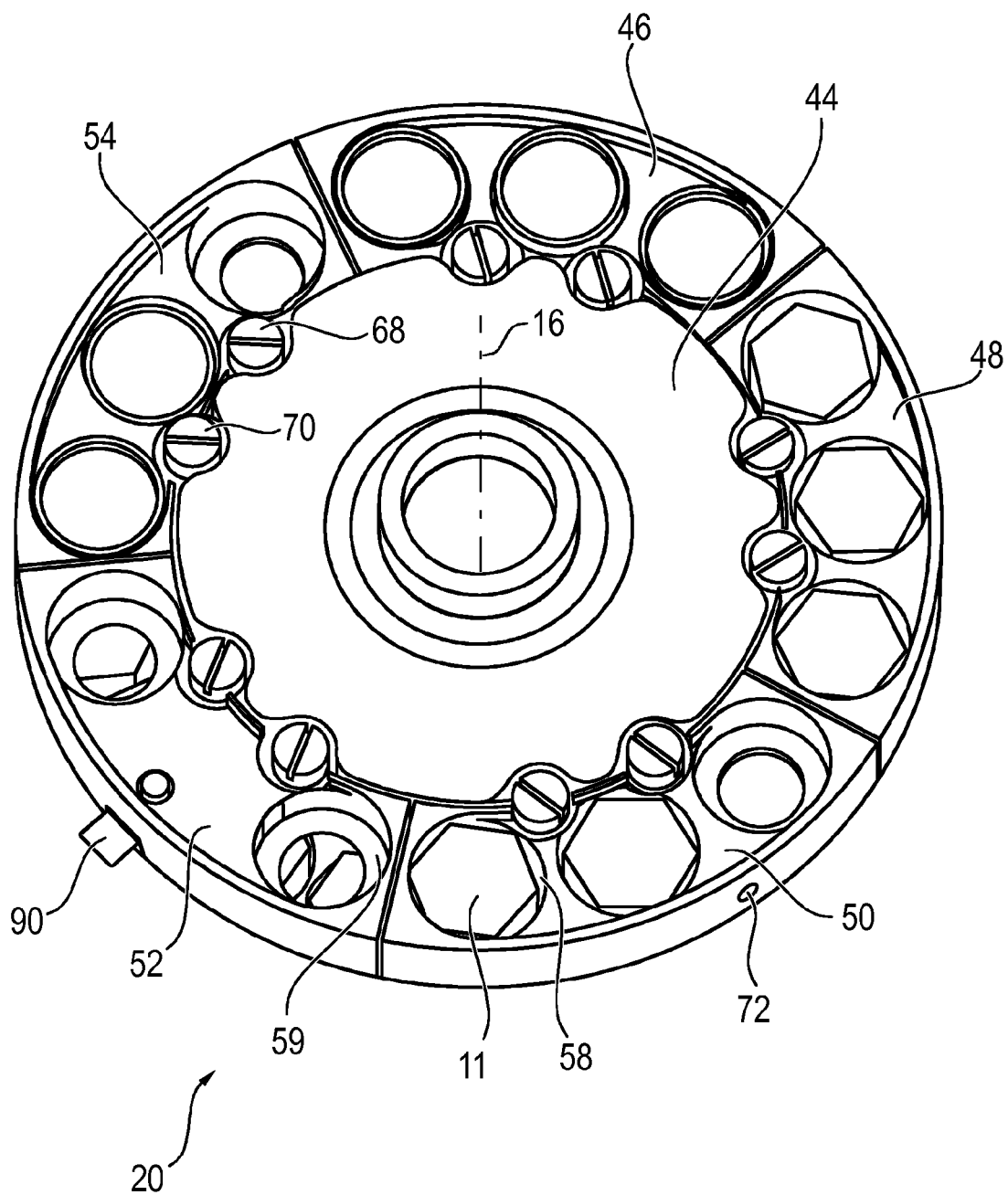
FIG. 5 shows a schematic, perspective illustration of a second filter wheel of the filter wheel pair according to FIG. 3.

FIG. 5 shows a schematic, perspective illustration of the second filter wheel 20. The second filter wheel 20 comprises a rotary basic body 44 which can be rotated about the axis of rotation 16 by means of drive unit 14, as well as five segments 46, 48, 50, 52 and 54 which can be connected to this basic body 44 through a releasable and restorable connection. Segments 46 to 50 and 54 each have three housing areas 58, 59 and the segment 52 has two housing areas 58, 59 for housing at least one filter 11. Housing areas 58, 59 of the segments 46 to 54 are particularly identical to housing areas 24 to 36 of the first filter wheel 18. The centers of housing areas 24 to 36 each show the same distance to the axis of rotation 16 as the centers of housing areas 58, 59 of segments 46 to 54.

Figure 6:
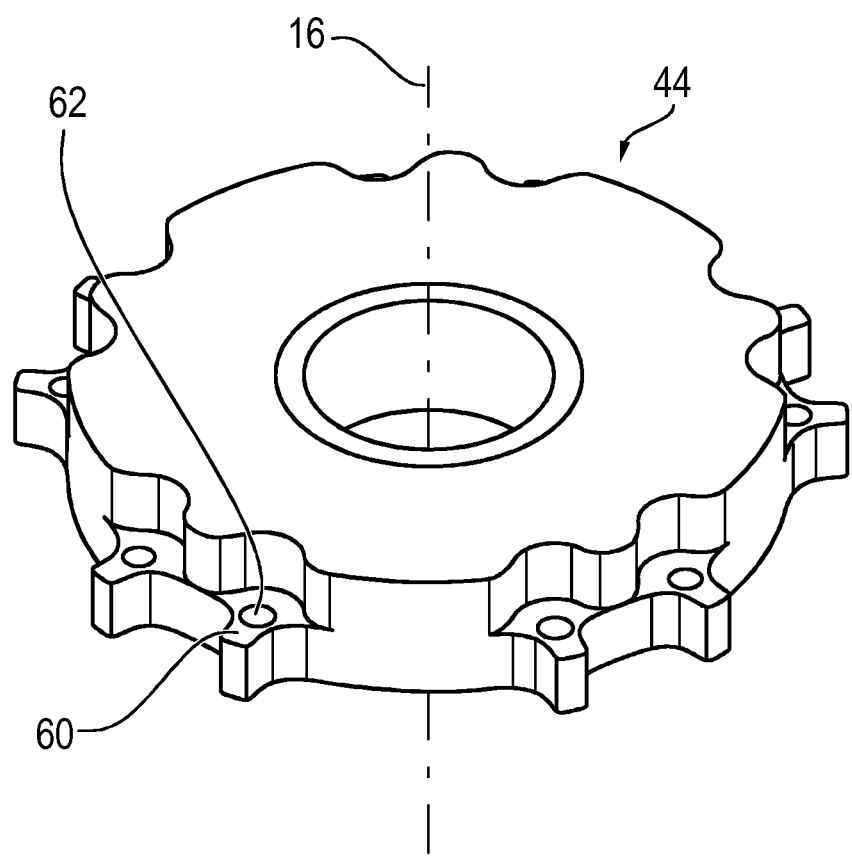
FIG. 6 shows a schematic, perspective illustration of a basic body of the second filter wheel according to FIG. 5.
Figure 7:
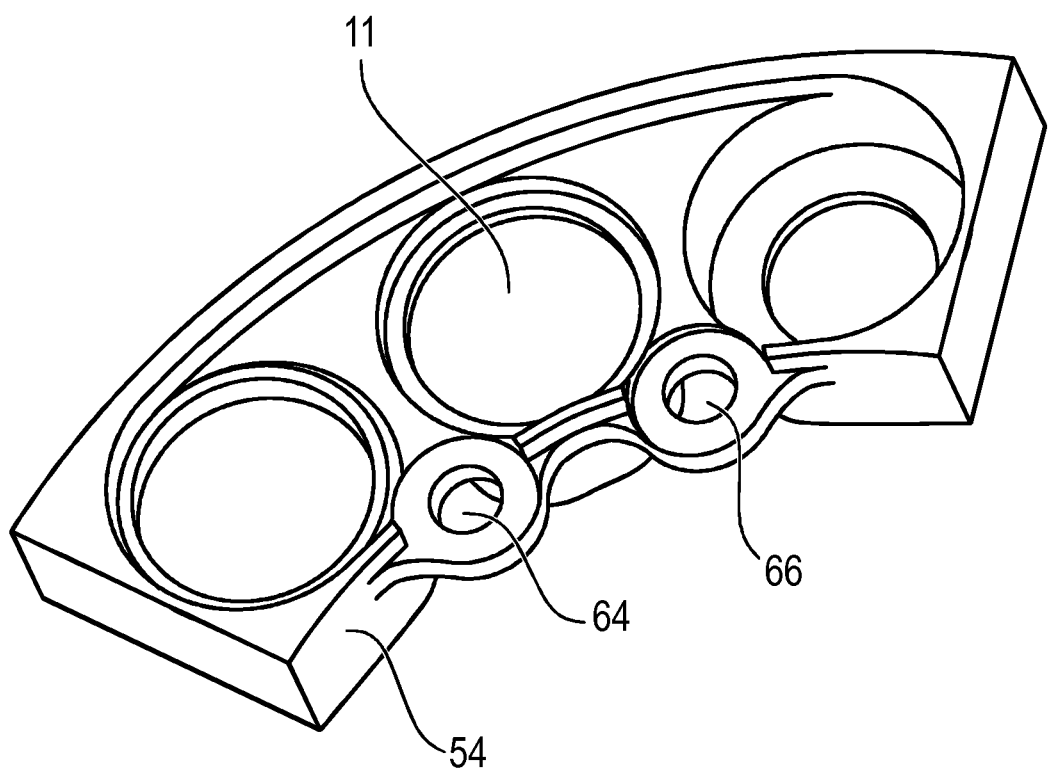
FIG. 7 shows a schematic, perspective illustration of a first segment of the second filter wheel according to FIG. 5.
Figure 8:
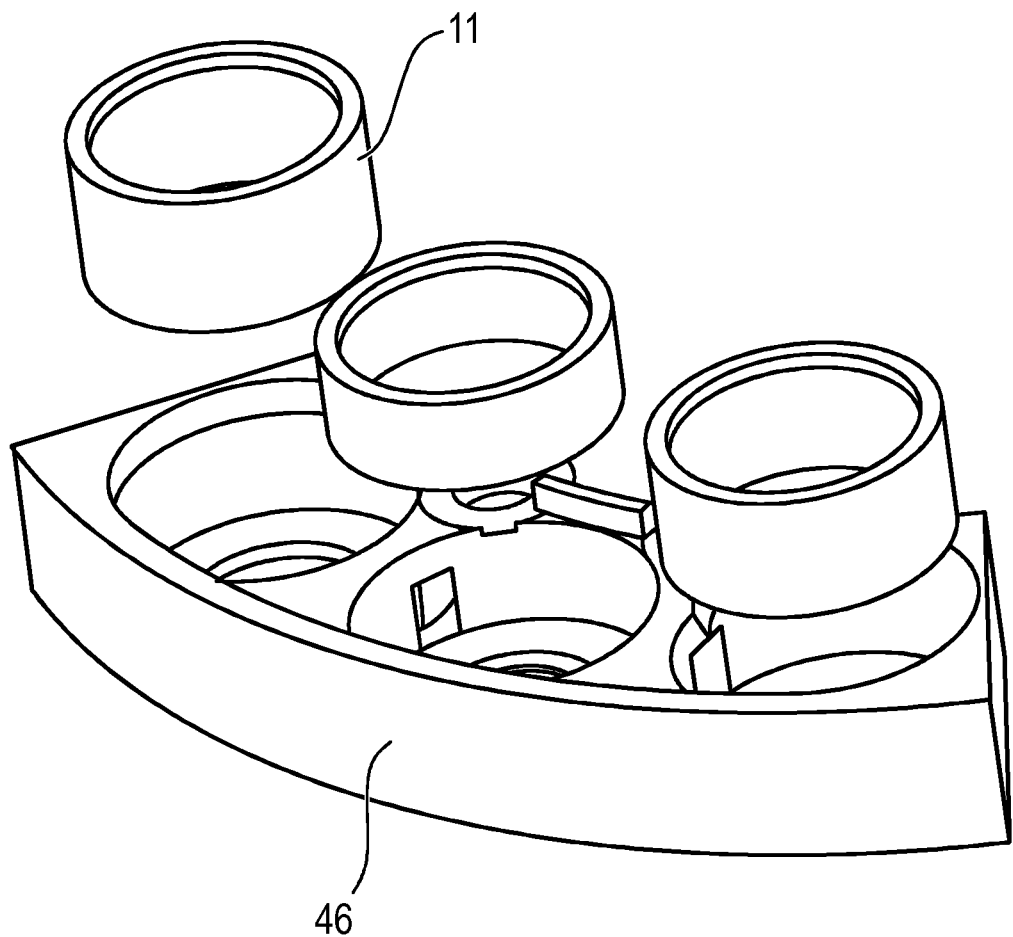
FIG. 8 shows a schematic, perspective illustration of a second segment of the second filter wheel according to FIG. 5.
Figure 9:
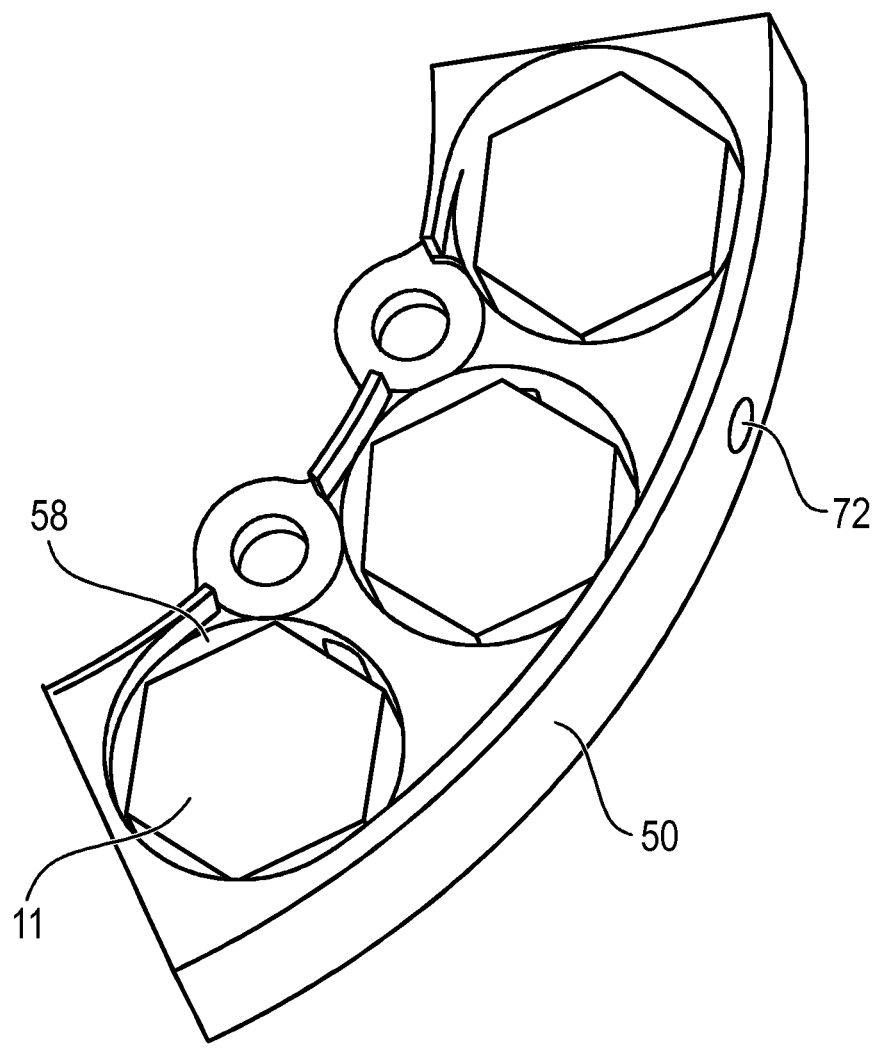
FIG. 9 shows a schematic, perspective illustration of a third segment of the second filter wheel according to FIG. 5.

FIG. 6 shows a schematic, perspective illustration of basic body 44. FIGS. 7 to 9 each show a schematic, perspective illustration of one of the segments 46 to 54 of the second filter wheel 20.

Basic body 44 has ten support areas 60 as well as ten bores 62, with two support areas 60 and two bores 62 each serving to attach one of the segments 46 to 54. The segments on the other hand each show two bores 64, 66. To attach a segment 46 to 54 by means of the releasable and restorable connection, the segment together with sectors which surround bores 64, 66 is supported on a support area 60 of basic body 44, and two screws 68, 70 are engaged with an internal thread of each borehole 62 of the support area 60. This leads to a secure but releasable and restorable bolted connection between segments 46 to 54 below basic body 44. By means of fastening with two screws 68, 70 per segment 46 to 54, an exact positioning of segments 46 to 54 relatively to basic body 44 is particularly guaranteed.

Moreover, this bolted connection makes it easy to change segments 46 to 54, so if filter 11 is to be changed it is not necessary to change the entire filter wheel 20 but only segments 46 to 54 in which the respective filter 11 is situated.

Thus, especially the configuration of the second filter wheel 20 can be adapted easily to the respective application.

Segment 50 as shown in FIG. 9 shows a lateral assembly bore 72 with an internal thread, into which during assembly of segment 50 to basic body 44 a pin or a screw can be screwed in, above which segment 50 can be held easily. After segment 50 is screwed to basic body 44, the pin or bolt is removed from assembly bore 72.

As already described for the first filter wheel 18, at least one housing area of the second filter wheel 20 will not be equipped, i.e. no filter 11 is arranged in such housing area.

As already described above, the two filter wheels 18, 20 are rotatable independently from each other about axis of rotation 16 through drive unit 14. If a filter 11 situated in the first filter wheel 18 is to be used for microscopy, the first filter wheel 18 is rotated such that this filter 11 is arranged in the ray path of the microscope. The second filter wheel 20 is rotated such that the unloaded housing area 59 which serves as a transmission range is also arranged in the ray path of the microscope so that the light is only filtered through filter 18 situated in the first filter wheel 18.

In order to filter the light with filter 11 which is arranged in the second filter wheel 20, the second filter wheel 20 is rotated to position this filter 11 in the ray path, with the first filter wheel 18 being rotated such that the unloaded housing area 24 to 36 which serves as a transmission range is arranged in the ray path.

As a result a very compact structure of device 10 is achieved, which nevertheless can accommodate a great number of filters 11. Furthermore, by changing the individual segments of the second filter wheel 20 it is also achieved that device 10 can be adapted easily to the respective application.

The first filter wheel 18 and the basic body 44 of the second filter wheel 20 are also particularly mounted by means of a releasable and restorable connection so that filter wheels 18, 20 can also be changed easily. If one or more segments 46 to 54 are to be changed the second filter wheel 20 in particular is removed from the microscope.

With an alternative embodiment of the invention it can be the case that only the second filter wheel 20 can be removed, whereas the first filter wheel 18 remains permanently in the microscope.

With another alternative embodiment of the invention both filter wheels 18, 20 can be formed in segments, i.e. both filter wheels 18, 20 can each include a basic body 44 and several segments 46 to 54 which can be connected with this basic body 44. Alternatively, both filter wheels can be formed according to the first filter wheel 18 as a one-piece, i.e. without exchangeable segments 46 to 54.

Moreover, another alternative could be that the second filter wheel 20 includes more or less than five segments 46, 54, for example four or six segments 46, 54. Another possibility is that the segments 46 to 54 include more than three housing areas 58, 59, for example four housing areas 58, 59. Furthermore, it is possible that the basic body 44 itself comprises housing areas for housing filters 11, and only one part of the housing areas 58, 59 of the filter wheel 20 is arranged in the segments 46 to 54 and can thus be changed easily.

Both the first filter wheel 18 and the second filter wheel 20 may include a tag 90, 92 protruding in a radial direction of the filter wheels 18, 20 through which by means of light barriers the respective rotary position of the filter wheels 18, 20 can be detected easily.

In an alternative embodiment, instead of a filter wheel pair 22, device 10 may comprise only the second filter wheel 20. Thus, the number of housing areas 58 is reduced but an even finer (i.e. more compact) design of device 10 can be achieved.

The invention is not to be limited to the specific embodiments disclosed, and modifications and other embodiments are intended to be included within the scope of the invention.

LIST OF REFERENCE NUMERALS

10 Device
11 Filter
12 Housing
14 Drive unit
16 Axis of rotation
18, 20 Filter wheels
22 Filter wheel pair
24 to 38, 58, 59 Housing area
40 Opening
42 Support area
44 Basic body
46 to 54 Segment
60 Support area
62 Bore
64, 66 Bore
68, 70 Bolt or screw
72 Assembly bore
90, 92 Tag

What is claimed is:

1. A device for holding filters for microscopes, comprising:
a first filter wheel pivot-mounted around an axis of rotation;
a second filter wheel pivot-mounted around the axis of rotation, the second filter wheel being displaced relative to the first filter wheel along the axis of rotation; and
a drive unit for rotating the first filter wheel around the axis of rotation and for rotating the second filter wheel around the axis of rotation, wherein the first filter wheel and the second filter wheel are rotatable independently of each other about the axis of rotation;
wherein the first filter wheel and the second filter wheel each include a respective plurality of housing areas, each housing area being configured to hold at least one filter;
wherein the first filter wheel and the second filter wheel each include a respective transmission range for the unfiltered transmission of lights;
wherein the transmission range of the first filter wheel differs from the plurality of housing areas of the first filter wheel such that a filter configured to be held by one of the plurality of housing areas of the first filter wheel cannot be held by the transmission range of the first filter wheel; and
wherein the transmission range of the second filter wheel differs from the plurality of housing areas of the second filter wheel such that a filter configured to be held by one of the plurality of housing areas of the second filter wheel cannot be held by the transmission range of the second filter wheel.

2. The device according to claim 1, wherein the transmission range of the first filter wheel is formed by a filterless housing area of the first filter wheel and the transmission range of the second filter wheel is formed by a filterless housing area of the second filter wheel.

3. The device according to claim 1, wherein in a first operating state, the first filter wheel and the second filter wheel are rotated relative to each other such that a first support area of the first filter wheel is aligned with the transmission range of the second filter wheel; and
wherein in a second operating state, the first filter wheel and the second filter wheel are rotated relative to each other such that a second support area of the second filter wheel is aligned with the transmission range of the first filter wheel.

4. The device according to claim 1, wherein the first filter wheel and the second filter wheel are connected by a selectively releasable connection to an axle having a longitudinal axis, the longitudinal axis being coincident with the axis of rotation.

5. The device according to claim 1, wherein the drive unit includes at least one stepping motor for rotating the first filter wheel and the second filter wheel.

6. The device according to claim 1, wherein the drive unit includes a manually operable operating element for rotating the first filter wheel and the second filter wheel.

7. The device according to claim 1, wherein the transmission range of the first filter wheel has a diameter that is less than a diameter of the plurality of housing areas of the first filter wheel, and the transmission range of the second filter wheel has a diameter that is less than a diameter of the plurality of housing areas of the second filter wheel.

8. A microscope, comprising:
   a device for holding filters, comprising:
      a first filter wheel pivot-mounted around an axis of rotation;
      a second filter wheel pivot-mounted around the axis of rotation, the second filter wheel being displaced relative to the first filter wheel along the axis of rotation; and
      a drive unit for rotating the first filter wheel around the axis of rotation and for rotating the second filter wheel around the axis of rotation, wherein the first filter wheel and the second filter wheel are rotatable independently of each other about the axis of rotation;
   wherein the first filter wheel and the second filter wheel each include a respective plurality of housing areas, each housing area being configured to hold at least one filter;
   wherein the first filter wheel and the second filter wheel each include a respective transmission range for the unfiltered transmission of light;
   wherein the transmission range of the first filter wheel differs from the plurality of housing areas of the first filter wheel such that a filter configured to be held by one of the plurality of housing areas of the first filter wheel cannot be held by the transmission range of the first filter wheel; and
   wherein the transmission range of the second filter wheel differs from the plurality of housing areas of the second filter wheel such that a filter configured to be held by one of the plurality of housing areas of the second filter wheel cannot be held by the transmission range of the second filter wheel;
   wherein in a first operating state the first filter wheel and the second filter wheel are rotated relative to each other such that a first filter held in a first housing area of the first filter wheel and the transmission range of the second filter wheel are arranged in a ray path of the microscope; and
   wherein in a second operating state the first filter wheel and the second filter wheel are rotated relative to each other such that a second filter held in a second housing area of the second filter wheel and the transmission range of the first filter wheel are arranged in the ray path of the microscope.

9. The microscope according to claim 8, wherein the transmission range of the first filter wheel has a diameter that is less than a diameter of the plurality of housing areas of the first filter wheel, and the transmission range of the second filter wheel has a diameter that is less than a diameter of the plurality of housing areas of the second filter wheel.

\* \* \* \* \*